United States Patent [19]

Johnston

[11] 4,144,837
[45] Mar. 20, 1979

[54] COATING APPARATUS

[75] Inventor: Edward Johnston, Chertsey, England

[73] Assignee: Carrier Drysys Limited, London, England

[21] Appl. No.: 839,536

[22] Filed: Oct. 5, 1977

[30] Foreign Application Priority Data

Oct. 5, 1976 [GB] United Kingdom ............... 41359/76

[51] Int. Cl.² ............................................. B05B 12/02
[52] U.S. Cl. ......................................... 118/7; 118/323; 427/424
[58] Field of Search .................... 118/2, 3, 7, 8, 9, 323; 427/424

[56] References Cited

U.S. PATENT DOCUMENTS

| 2,731,110 | 1/1956 | Woolard | 118/8 |
| 3,027,273 | 3/1962 | Sacks | 118/323 X |
| 3,255,037 | 6/1966 | Knight et al. | 118/8 X |
| 3,742,901 | 7/1973 | Johnston | 118/323 X |
| 3,777,702 | 12/1973 | Fitzgerald | 118/2 |
| 3,872,825 | 3/1975 | Davidson | 118/7 |

FOREIGN PATENT DOCUMENTS 2237275  2/1973  Fed. Rep. of Germany .............. 118/7

Primary Examiner—Mervin Stein
Attorney, Agent, or Firm—Sughrue, Rothwell, Mion, Zinn and Macpeak

[57] ABSTRACT

Coating apparatus for coating an article by successive strokes of a coating applicator transverse to the direction of relative movement of the article includes an opto-electrical transducer such as a television camera arranged to view in one vertical window the applicator during its stroke and in a second spaced vertical window an area of the article to be coated, means being provided to store information obtained during a scan of the second vertical window indicating regions of the article to be coated and control means arranged to control operation of the applicator in dependence on the detected portion of the applicator in the first window and the information stored from a previous scan of the corresponding region of the article through the second window.

6 Claims, 3 Drawing Figures

COATING APPARATUS

BACKGROUND OF THE INVENTION

The present invention relates to the coating of the surface of an object which may be one of a succession of objects, for example the spray coating of vehicle bodies. U.S. Pat. No. 3,742,901 describes and claims apparatus and methods for coating the surface of a body which enable a succession of objects to be coated even if they arrive at a coating station in random sequence and even if the sizes and shapes of the surfaces to be coated are not known before the objects reach the coating apparatus. The present invention relates to an improvement in the methods and apparatus disclosed in U.S. Pat. No. 3,742,901. In accordance with the arrangement described in the earlier patent, an object to be coated is scanned by means of a television camera, the scanning by the camera being effected at the same time as a coating device is moved along a scanning stroke across the object to be coated. Problems can however arise in scanning the article at the same time as the coating device is operating to apply a coating stroke to the article. Furthermore, the above mentioned patent describes a digitising device for use in indicating the position of the coating device during each coating stroke. In accordance with the present invention, a television camera or other opto-electrical transducer is used to indicate the position of the coating device as well as scanning the article to be coated and the camera or transducer is arranged to carry out a vertical scan across the article before the coating device begins a coating stroke, the information derived from the television camera or transducer during the vertical scan being stored and subsequently read out from the store to control operation of the coating device during the coating stroke. By scanning with the camera or transducer before the coating device is operated and storing the information for subsequent use, the field of view of the camera or transducer during scanning is not obscured by the coating device or a paint cloud.

SUMMARY OF THE INVENTION

The present invention provides coating apparatus for coating an article moving relative to a coating station, which apparatus comprises a coating applicator, such as for example a spray gun located at the coating station, a reciprocator for moving the applicator in strokes transverse to the direction of relative movement, a television camera or other opto-electrical transducer arranged to view at least part of the article and the applicator, the field of view being such as to cover the full area of each coating stroke, and control means responsive to an output signal from the camera or transducer and operable to control the operation of the applicator to apply coating material only when the applicator is located adjacent part of the article to be coated, which control means comprises first control means for identifying the position in the vertical field of view of the camera or transducer to which video signals from the camera or transducer correspond, second control means for identifying a first window in the horizontal field of view of the camera or transducer corresponding to the path of the applicator and a second spaced window in the horizontal field of view corresponding to an area which may be coated by the applicator, third control means for determining whether the signal in the first window corresponds to the presence of the applicator as the television camera or transducer effects a vertical scan, and fourth control means for determining whether the signal in the second window corresponds to part of the article to be coated as the camera or transducer effects a vertical scan, store means for storing signals from said first control means and said fourth control means, and fifth control means arranged to read information from the store means and provide an operating signal for controlling the applicator when the first control means and third control means provide signals indicating that the applicator is in an operating position.

Preferably a monitoring device is provided and arranged to provide a visual display of the field of view of the camera or transducer and the position of the first and second windows.

Preferably the third and fourth control means each include means for detecting whether the video signal from the camera or transducer is above or below predetermined threshold levels.

Preferably the store means includes means for storing information derived from a plurality of strokes of the applicator.

Although a television camera is a particularly suitable device for use with the invention, it will be appreciated that other scanning opto-electrical transducers may be used.

In some cases it may be desirable to provide a plurality of applicators at spaced positions along the direction of relative movement, each applicator being arranged to be controlled by a common television camera and control means. In this case the camera may be arranged to view only one of the applicators and the store means is arranged to store information derived from a plurality of strokes of said one applicator, synchronising means being provided to read from the store after suitable delay control information for each applicator corresponding to the particular part of the article on which that applicator may operate.

The invention also provides apparatus for controlling the activation of an applicator for use in coating an article or articles by successive coating strokes as the article or articles are moved past a coating station, which apparatus comprises means including a television camera for scanning across the article at the coating station to detect the presence, at points throughout the field of scan, of an article to be sprayed, means for storing information detected during each scan, the camera also being arranged to scan the field of movement of the applicator to detect the position of the applicator, means for extracting from the storing means information dependant on the position of the applicator and means for controlling activation of the applicator dependant on whether or not the information extracted corresponds to the detection of the presence of an article to be coated.

Preferably a reciprocator is provided for moving the applicator in a direction across the direction of movement of the articles.

Preferably the means for extracting information from the storing means is arranged to extract information corresponding to a position adjacent the position of the applicator. In some cases the means for extracting information includes compensating means operable to cause information to be extracted from the storing means corresponding to a part of the scan displaced from the determined position of the applicator. In this way it is possible to compensate for delay in switching on or switching off the applicator as well as errors which might otherwise result from the applicator being arranged at an angle to the surface other than the perpendicular. If the applicator is not directed perpendicular to the surface the point of application of the coating material may be displaced from the position of the applicator itself and this may need to be taken into account when determining the time of switching off and on of the applicator.

Preferably the compensating means includes setting means for setting a different displacement factor for each of the two directions of movement of the applicator.

Preferably a highly reflective surface is secured to the applicator so as to enable the position of the applicator to be more easily detected.

Preferably means is provided for extracting from the storing means information corresponding to a previous coating stroke so that the information may be reused for controlling the actuation of a further applicator.

The invention also provides a method of coating the surface of an article which comprises moving the article past a coating station at which an applicator is located, moving the applicator across the direction of movement of the article so that coating material is applied in strokes, scanning the article in the direction of the coating strokes by means of a television camera or other opto-electrical transducer to detect the presence, at points throughout the field of scan, of an article to be sprayed, storing the information detected during the scan, moving the applicator along a coating stroke across the region which has been scanned by the camera or transducer, detecting the position of the applicator along the coating stroke by use of the television camera or transducer and reading stored information from the camera or transducer scan in dependence on the position of the applicator to control activation of the applicator.

DESCRIPTION OF THE PREFERRED EMBODIMENT

Figure 1:
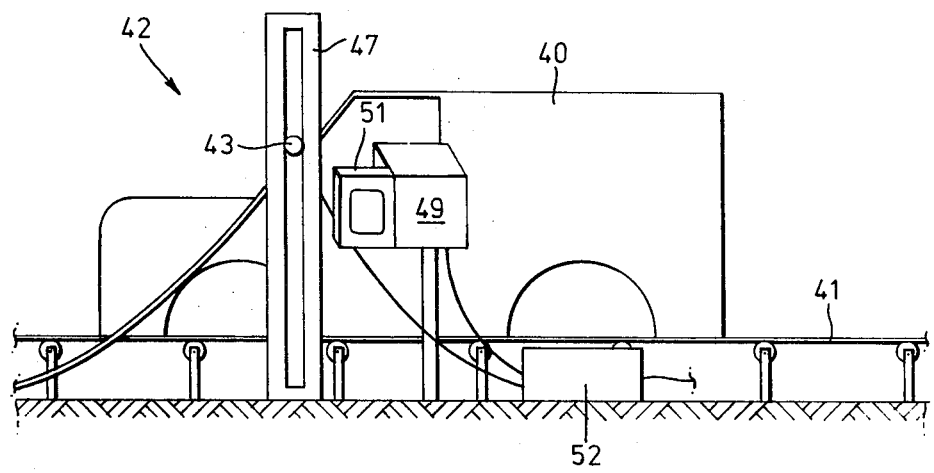
FIG. 1 is a side schematic view of a coating apparatus in accordance with the present invention.

In this example a succession of vehicle bodies 40 are conveyed continuously on a conveyor 41 past a coating station 42 at which paint is sprayed onto the surface of the vehicle bodies. In order to coat the sides of the vehicle, a succession of three spray guns 43, 44 and 45 are provided although only one spray gun 43 is shown in FIG. 1. The three spray guns are mounted on a common support 46 and they are movable in unison up and down a vertical support 47 so as to apply vertical painting strokes as the vehicle bodies move by. The guns are moved up and down fixed paths by reciprocating means (not shown) which may be pneumatically operated. The strokes of the spray guns start below the bottom edge of the vehicle bodies and stop above the level of the highest vehicle body to be coated. As the guns reciprocate, the supply of paint and compressed air through lines 48 is controlled by the use of a television camera 49 so that paint is only applied to the surface areas of the bodies to be coated and the paint supply to the guns is switched off as soon as the guns reach the edges of the vehicle body.

Figure 2:
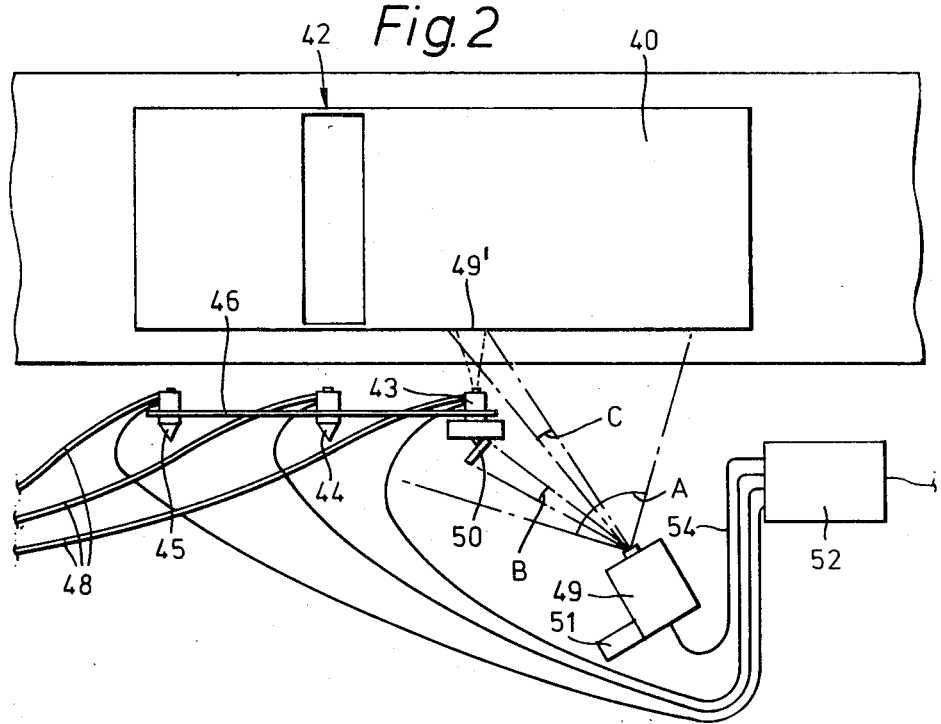
FIG. 2 is a plan view of the arrangement shown in FIG. 1.

As can be seen from FIG. 2, the television camera 49 is arranged so that its field of view includes the first spray gun 43 as well as the region 49' which is coated by the stroke of the first spray gun 43. The angle of field of view of the camera is marked A in FIG. 2. The spray gun 43 is provided with a reflector 50 to assist identification of the spray gun position in the camera field of view. The camera is provided with a monitor 51 arranged to give a visual display of the camera field of view. The output of the camera is arranged to provide a video signal to a control unit 52 which is shown in more detail in FIG. 3. The control unit 52 is also arranged to provide outputs on lines 53 to the control valves (not shown) of each of the spray guns 43, 44 and 45.

The camera 49 is used to scan the vertical strip 49' on the vehicle body which corresponds to one vertical coating stroke of the spray gun 43. The camera is also used to scan the vertical movement of the spray gun 43 by detecting the positon of the reflector 50. In order to monitor movement of the reflector 50, the control unit 52 enables the selection of a first window in the horizontal field of view of the camera 49, this first window corresponding to the vertical stroke path of the mirror 50. The control unit, as will be described below, enables marker lines to occur on the monitor screen 51 corresponding to the first window, the width of the window being indicated by the angle B in FIG. 2. In order to identify the strip 49' on the vehicle body, the control unit 52 permits the formation of a second window in the horizontal field of view of the television camera. This second window is also marked on the monitor screen 51 by white lines and the second window corresponds to the angle marked C in FIG. 2.

Problems can arise in attempting to scan the vehicle body at the same time as the spray gun 43 is directing paint towards the body as the spray gun itself and the cloud of paint can tend to obscure the article and cause problems for the camera in attempting to detect whether or not the spray gun is adjacent part of the article to be coated or not. Consequently, in accordance with the present invention, the camera is used to scan the whole vertical strip 49' and store the information in the control unit 52 before the spray gun 43 begins its coating stroke. In this way the spray gun 43 can be controlled by information extracted from the store throughout one whole scan. The store can be updated at the beginning of each stroke of the spray gun 43. Furthermore, spray guns inevitably involve some delay in issuing paint on being switched on and terminating the paint supply when being switched off. The control unit 52 enables a compensation factor to be introduced so that the spray gun 43 can be controlled by information read out from the store one or two scanning lines ahead of the position of the spray gun. The amount of compensation needed for up and down movement of the spray gun may be different for the two directions and in accordance with this example, separate compensation factors may be provided for the up and down movement of the spray gun. Furthermore, it may not be possible to maintain the spray guns in a direction which is perpendicular to the surface of the article being coated across the entire coating stroke. If the gun has to be tilted at some other angle to the surface to be coated then some compensation is needed as the region of the article which will receive paint from the gun will not be at the same vertical position as the gun. The control unit 52 enables compensation for such a factor in the same way as compensating for delay in switching on or switching off the paint supply to each gun.

As has been described above, the camera 49 is arranged to view the gun 43 although the camera is common to all the spray guns 43 to 45. The information store in the control unit 52 is arranged to store information from a plurality of strokes of the spray gun 43 so that after completion of one stroke of the spray gun 43 the information used for controlling that stroke is retained in the store so that it can be subsequently used after an appropriate time delay for operation of the subsequent spray guns 44 and 45. In this particular example the information may be kept for up to sixteen successive strokes of the spray gun 43 and the spray guns 43 and 45 are located at known positions within a maximum of sixteen stroke width so that the information can be taken out of the store for each spray gun in turn.

Figure 3:
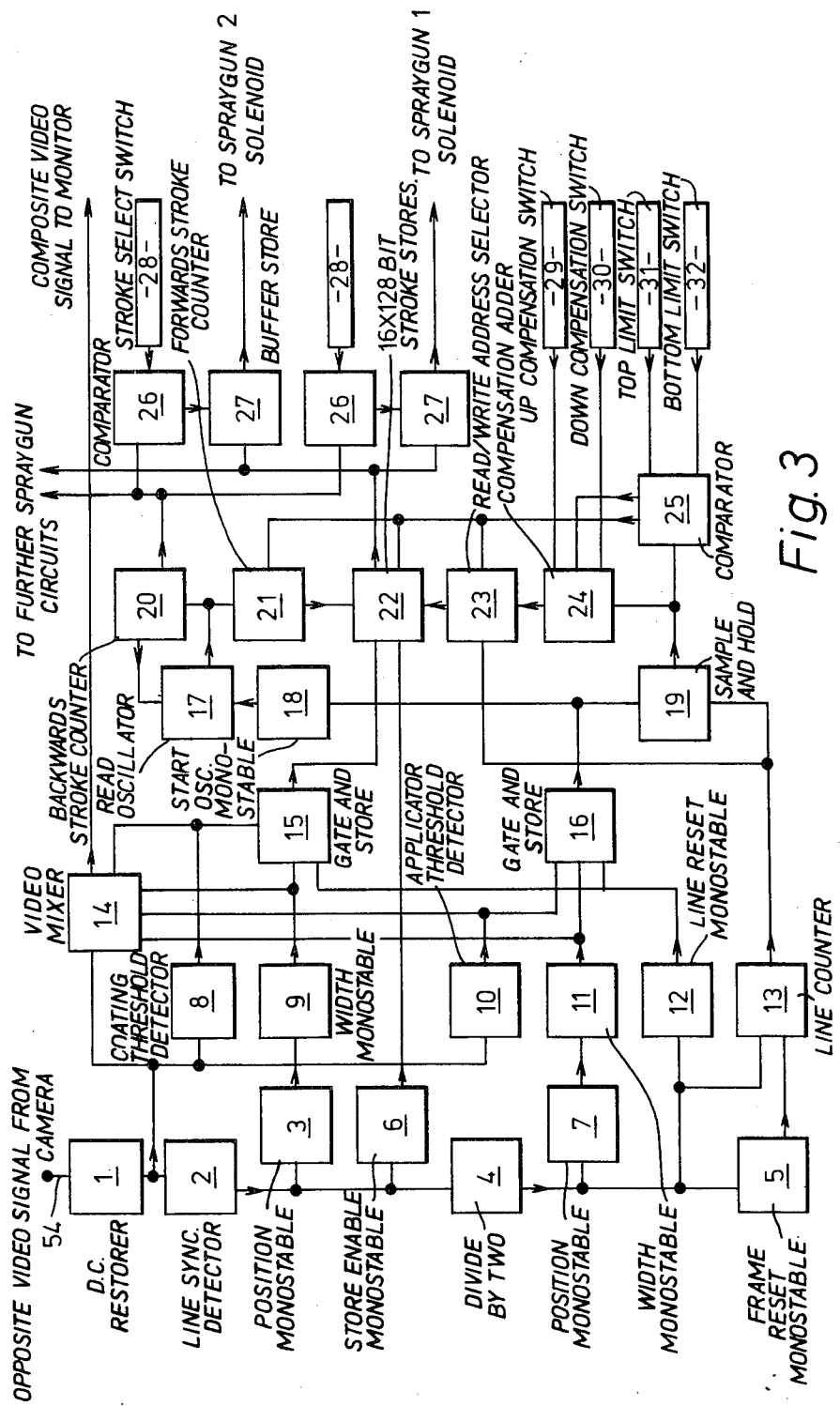
FIG. 3 is a block diagram of the control circuits used with the apparatus of FIGS. 1 and 2.

The operation of the control unit 52 will now be described with reference to FIG. 3. The video signal from the camera is fed along line 54 to a DC restorer 1 which refers the video signal to a zero voltage level which thereby provides a reference level from which the signal magnitude can subsequently be measured. The camera used normally provides 625 lines which consist of two sets of 312 lines each interlaced. Of the 312 lines, the first twenty are not used due to delay in movement of the spot on the television screen at the beginning of each scan. This leaves 292 usable lines and in accordance with the present system, this is divided into two to give two sets of 146 lines. As the store to be described later accommodates 128 bits, the present example makes no use of 18 lines and derives scanning information solely from 128 lines. Each line is provided with a synchronising pulse at the beginning of the line. The output signal from the restorer 1 is then fed to a voltage comparator 2 which is adjusted to detect the synchronising pulse at the beginning of each line. These pulses are passed to a divide by two unit 4 so that only information from every other line is used. The output from unit 4 which provides synchronising pulses for every line pair is connected to a line counter 13 which counts the line pairs and each line pair is given a consecutive number in the range 000 to 127. When the 127th line pair has been counted, counter 13 is arranged to ignore all further pulses presented to it. In this way, although there will be 146 line pairs available per frame of the television scan, all those after 126 are given the number 127. As already described, this is the largest number that can be handled by the memory 22 in this example. After being counted, the binary version of the number is passed to a sample and hold circuit 19 and a read/write address selector 23. The use of these units will be described below.

The line pair signal from the divide unit 4 is also passed to a monostable 5 where it continuously triggers the monostable circuit until the end of the frame. Before the start of the next frame there is a pause of some twenty lines. During this time the line pair signal is absent and the monostable 5 recovers to give a resetting pulse to the line counter 13. Thus the counter 13 is set to zero ready for the beginning of the next frame. In this way, the field of view of the television camera is divided into horizontal strips and each strip is given a number starting with zero at the top running through to 127 at the bottom. In order to select only that part of the field which is covered by the spray gun during one stroke, it is necessary to generate a window signal corresponding to the window C marked in FIG. 2. To do this the synchronising pulses from detector 2 are fed to a monostable circuit 3 that has a variable time constant. The variable time constant enables the leading edge of the window to be adjusted across the field of view to align it with the applicator which produces strip 49'. From the monostable 3 the window position pulse is fed to another monostable circuit 9 which controls the width of the window. This is also variable and permits adjustment of the window width to match the width of coating material applied in one stroke.

A similar window is generated for selecting that part of the field of view, marked B in FIG. 2, which displays the motion of the spray gun and its reflector 50. For this window a line pair signal from the unit 4 is passed to a monostable 7. This has a variable time constant as before so that the leading edge of the window can be positioned anywhere in the field of view. This position signal is then passed to a further monostable 11 to set the width of the window. In this case the width is set so that it contains the applicator reflector signal throughout the whole of the coating stroke. In order that the above adjustments can be made easily, the relevant signals are fed to a video mixer 14. Here the two window signals are mixed with the composite video signal from the restorer circuit 1 and the result is passed to the monitor 51 where they appear as white vertical stripes superimposed upon the field of view.

To ensure that the product to be coated is differentiated from the background under the most adverse conditions, the lighting is arranged so tht the product is highlighted within the coating zone of strip 49'. Thus no matter what colour or surface texture the product has it will always appear brighter than the background.

In this way a simple adjustable voltage comparator 8 is all that is needed to detect the product to be coated in the composite video signal from the unit 1. As it is only necessary to detect products to be coated along the strip 49', the video signal is passed to a gate and store circuit 15 where it is compared in time with the coating window signal from the monostable 9. If the two signals coincide the results is stored in the unit 15 which is a gated buffer store.

In a similar manner an adjustable voltage comparator 10 detects the applicator reflector in the composite video signal from the restorer 1. This signal is passed to a gate and store circuit 16 where it is compared in time with the applicator window from the monostable 11. If the two signals coincide the result is stored in the unit 16 which is a gated buffer store. It is only necessry to hold the information in the units 15 and 16 until the end of that particular line pair so the units 15 and 16 have another input, a reset signal from a reset monostable 12. To generate the reset signal the line pair signal is fed to the monostable circuit 12 which emits a short duration pulse at the beginning of each line pair to ensure that both the buffer stores 15 and 16 are cleared.

In order that the adjustable voltage comparators 8 and 10 can be set easily to detect whether or not the signals are above or below threshold levels, the signals from the units 8 and 9 are fed to the video mixer 14 where they are mixed with the composite video from the unit 1. The result as seen on the monitor is a white "blooming" effect as the comparators 8 and 10 detect the brighter signals. The coating adjustment is correct when the product to be coated in the coating zone stands out clearly from the background. Similarly the applicator reflector stands out from its background.

The output signal from the unit 15 needs to be stored against an address. This is done by the store 22 which is a 16 × 128 bit memory. In other words each line pair either generates or does not generate a signal indicating "product to be coated" and each line pair is numbered by the line counter 13. This line pair number is used to open a particular address location in the store 22 in the range 000 to 127. The result stored there is obtained from the gate and store 15 as "product to be coated" or "not product to be coated". Since the memory 22 can be operated in two different ways with two different sets of addresses the output from the line counter 13 does not go directly to the store 22 but goes first to a read/-write address selector 23. At present we are considering writing data into the memory 22 so it is the output from line counter 13 that is selected by the unit 23 and fed to the store 22. To write the information into the memory during the time that the address and the data signals are sent to the store 22 a third signal is needed to enable store 22 to accept the information. This signal is a short pulse generated by a monostable circuit 6 at the end of each line pair. The output signal from the gate and store 16 occurs whenever the camera scans the applicator reflector and this is used to operate a digital sample and hold circuit 19. Thus each time the applicator reflector is detected, the line pair number is loaded into the sample and store circuit 19. This binary number is then passed to a digital comparator circuit 25. The other inputs to comparator 25 come from a pair of 16 position switchs 31 and 32. Switch 31 is set to an upper limit value and switch 32 is set to a lower limit value. By comparing the line pair number from the unit 19 with the numbers set on the switches 31 and 32 the comparator circuit 25 produces an output signal indicating when the applicator is outside the two limits. The basic operating mode is that when the applicator is outside the two limits the write into memory condition is required so that the store is then receiving scanning information about the strip 49', but when the applicator is between the two limits then a read from memory condition is required so that the applicator is being controlled by information previously stored in the memory.

One other output signal from the comparator 25 indicates whether the applicator is moving up or down. The memory 22 and read or write selector 23 need to know when to read or when to write and this signal is obtained from the comparator 25. The memory 22 would normally obtain the read from memory address from the sample and hold circuit 19 via the read or write selector 23 but it is often necessary to compensate for accumulated delays or off-sets when coating. This is due to delay in switching on or off the spray gun or non-perpendicular alignment of the spray gun relative to the surface to be coated, as was described above. To cater for this, a compensation adding circuit 24 is interposed between the sample and hold circuit 19 and the read or write circuit 23. This compensation adder has two other inputs from a pair of 16 position switches 29 and 30. Switch 29 has a value set on it for compensating in the up direction of spray gun motion and switch 30 compensates during dowward motion. The up or down signal from comparator 25 to the compensation adder 24 decides which switch to use on each stroke. The compensation is applied in the read only mode.

So far we have considered memory 22 storing 128 bits of one stroke. It can however store up to sixteen strokes. These strokes are numbered 00 to 15 and are counted by a 16 count forward stroke counter 21. Each time the read or write signal from comparator 25 changes from read to write then stroke counter 21 is advanced by one count thereby bringing a fresh store into operation. When all sixteen have been used it is time for the first store to be used again and so on, reusing each store so that it is only the last sixteen strokes that are remembered.

In order to cause the applicator to emit coating material where there is a product to be coated, the information in memory 22 must be read and passed to the buffer store 27. However there are the contents of sixteen stroke stores from which to choose one stroke. The applicator described so far will use the contents of store 00, that is the most up to date store. To select the appropriate store each applicator, or spray gun, has a sixteen position selector switch 28 numbered 0 to 15. Thus the first spray gun would have its stroke selector switch 28 set to zero. Subsequent spray guns have their stroke selector switches 28 set to higher numbers depending on how far downstream from the spray gun 1 they are in terms of strokes counted. The output of switch 28 is fed to a digital comparator 26. The other input to comparator 26 comes from the sixteen count backward stroke counter 20. When the two inputs correspond, an output is generated by comparator 26 and passed to a buffer store 27 causing buffer store 27 to accept the information being passed to it by the memory 22. Upon accepting the information it is promptly passed on by the buffer store 27 to the spray gun controller. As the spray gun passes through each horizontal strip making up the field of view, the horizontal strips number is sampled and held by the unit 19, compensated for by the unit 24, selected for reading by unit 23 and finally used to address all of sixteen stroke stores in the memory 22. In order that all the spray guns may up date their buffer stores while the spray gun is detected as being in that horizontal strip, it is necessary for all the sixteen stroke stores to be cycled before the spray gun moves into the next horizontal strip. To do this an oscillator 17 is provided which drives both the forwards and backwards counters 21 and 20 together. The oscillator 17 is arranged to oscillate for sixteen counts only thereby driving the forwards counter around to its starting point. The backwards counter 20 is used to stop the oscillator 17 after sixteen counts. The oscillator 17 is started by the start oscillator monostable circuit 18 which generates a short duration pulse each time the sample and hold circuit 19 is updated by the spray gun detector buffer store 16.

It will therefore be seen that the composite video signal from the conventional close circuit television camera 49 is used to detect products to be coated and to detect the position and direction of motion of the spray guns. It is also used to provide an accurate representation of the product to be coated for subsequent action by the spray guns downstream of the spray gun 43. Other processing circuits may be used to enable up to sixteen spray guns to be individually controlled with compensation for delays in operating the spray guns or off-set factors caused by non-perpendicular alignment of the spray gun relative to the surface being coated. The size of the memory used limits the downstream separation between the first and last spray guns.

It will be understood that the invention is not limited to the details of the foregoing example.

I claim:

1. Coating apparatus for coating an article moving relative to a coating station, which apparatus comprises a coating applicator located at the coating station, a reciprocator for moving the applicator in strokes transverse to the direction of relative movement, a television camera or other opto-electrical transducer arranged to view at least part of the article and the applicator, the field of view being such as to cover the full area of each coating stroke, and control means responsive to an output signal from the camera or transducer and operable to control the operation of the applicator to apply coating material only when the applicator is located adjacent part of the article to be coated, which control means comprises first control means for identifying the position in the vertical field of view of the camera or transducer to which video signals from the camera or transducer correspond, second control means for identifying a first window in the horizontal field of view of the camera or transducer corresponding to the path of the applicator and a second spaced window in the horizontal field of view corresponding to an area which may be coated by the applicator, third control means for determining whether the signal in the first window corresponds to the presence of the applicator as the television camera or transducer effects a vertical scan, and fourth control means for determining whether the signal in the second window corresponds to part of the article to be coated as the camera or transducer effects a vertical scan, store means for storing signals from said first control means and said fourth control means, and fifth control means arranged to read information from the store means and provide an operating signal for controlling the applicator when the first control means and third control means provide signals indicating that the applicator is in an operating position.

2. Coating apparatus as claimed in claim 1 wherein a monitoring device is provided and arranged to provide a visual display of the field of view of the camera or transducer and the position of the first and second windows.

3. Coating apparatus as claimed in claim 1 wherein the third and fourth control means each include means for detecting whether the video signal from the camera or transducer is above or below predetermined threshold levels.

4. Coating apparatus as claimed in claim 1 wherein the store means includes means for storing information derived from a plurality of strokes of the applicator.

5. Coating apparatus as claimed in claim 1 in which the opto-electrical transducer is a television camera and a plurality of applicators are provided at spaced positions along the direction of relative movement, each applicator being arranged to be controlled by a common television camera and control means.

6. Coating apparatus as claimed in claim 5 wherein the camera is arranged to view only one of the applicators and the store means is arranged to store information derived from a plurality of strokes of said one applicator, synchronising means being provided to read from the store after suitable delay control information for each applicator corresponding to the particular part of the article on which that applicator may operate.

* * * * *